March 7, 1939. J. M. PEARSON 2,149,717

METHOD AND APPARATUS FOR CALIBRATING MAGNETOMETERS

Filed March 15, 1938

INVENTOR
John M. Pearson
BY
ATTORNEYS.

WITNESS:

Patented Mar. 7, 1939

2,149,717

UNITED STATES PATENT OFFICE 2,149,717

METHOD AND APPARATUS FOR CALIBRATING MAGNETOMETERS

John M. Pearson, Swarthmore, Pa., assignor to Sperry-Sun Well Surveying Company, Philadelphia, Pa., a corporation of Delaware Application March 15, 1938, Serial No. 195,987

4 Claims. (Cl. 175—183)

This invention relates to a method and apparatus for calibrating a magnetometer, and particularly the type of magnetometer for determining the magnetic properties of cores taken from bore holes.

As described, for example, in Herrick Patent 1,702,639, dated February 17, 1931, it is possible to determine to a fair degree of accuracy the dip and strike of strata penetrated by a bore hole if measurements are made to ascertain the magnetic characteristics of a core taken at the location of the strata. To secure these measurements, it is necessary to utilize an extremely sensitive magnetometer, adjacent a magnetic system of which the core is rotated to secure measurable deflections of the system. The necessity for providing a support for the core adjacent the suspended magnetic system of the magnetometer and for rotating the core on the support involves possibilities of disturbing the characteristics of the suspended system and of contaminating with ferrous materials the mechanical elements in the vicinity of the system. Thus it is necessary to make frequent tests of the condition of the magnetometer both as regards its sensitivity and adjustments and the absence of foreign materials which might affect its operation. The usual conventional scientific methods of adjusting an instrument of this character are inapplicable from a practical standpoint when the instrument is used commercially for the rapid determination of the magnetic properties of cores.

It is the object of the present invention to provide a method and means serving for the rapid determination of the proper adjustment and condition of a magnetometer specifically adapted for the practice of the method indicated above. Preferably, there are provided several testing devices adapted to be used under different conditions, first a testing device giving in absolute terms the constants of the magnetometer, and secondly other devices which, after the magnetometer is calibrated, may be used in much simpler fashion to determine whether the magnetometer is retaining its calibrated condition. The first device is thus used indirectly to calibrate a device of the second type, and that can then be used over long periods for the testing and calibration of the magnetometer until the magnetometer constants may assume large variations from their normal values.

In my application Serial No. 172,988, filed November 5, 1937, there is described an improved type of magnetometer of a high degree of sensitivity and adapted for the rapid determination and segregation of the magnetic characteristics of cores. The present invention is herein illustrated in a form specifically applicable to that instrument.

The above indicated objects and other objects of the invention will be apparent from the following description, read in conjunction with the accompanying drawing, in which.

Figure 1:
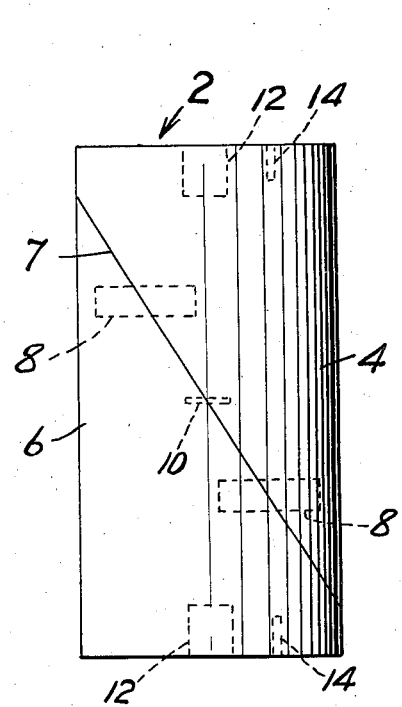
Figure 1 is an elevation of a dummy core adapted for testing purposes.

Referring first to Figure 1, there is illustrated therein a dummy core 2 comprising two portions, 4 and 6, formed of wood, Bakelite, or other non-magnetic and homogenous material, the two portions 4 and 6 together forming a cylinder and being secured along a diagonal surface indicated at 7. The two portions of the cylinder are accurately aligned by means of dowels 8 and are finally glued together by the use of a non-magnetic glue. The two portions of the core are provided with aligned recesses adapted to receive and locate in definite position a magnetic needle indicated at 10. This needle is magnetized to a suitable degree and the polarity marked on the outside of the core.

The core is provided with center supporting holes 12 and driving pin holes 14. Externally, it thus resembles a core secured from a bore hole provided with similar holes for mounting and driving in the magnetometer.

Figure 3:
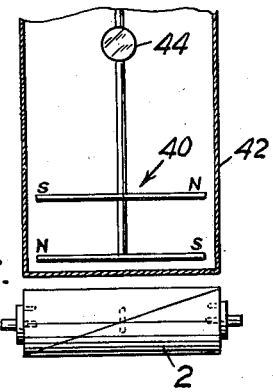
Figure 3 is a diagrammatic sectional view illustrating the relationship of the dummy core to the suspended magnetic system of the magnetometer.

In Figure 3 this core is shown in diagrammatic fashion in its relation to the suspended system of the magnetometer. It is mounted in supports of the type illustrated in my application referred to above, and is located in definite position with respect to the suspended system indicated at 40, which system carries a mirror 44 to produce a deflected beam for recording purposes. The magnetic system is provided with a surrounding housing of non-magnetic material indicated at 42.

The core of Figure 1 presents to the magnetic system, in effect, a magnetically polarized cylinder having uniform or isotropic susceptibility. It accordingly represents the simplest type of magnetized body which can be presented to the magnetometer. Therefore, if it is rotated first in one direction, and its position is then reversed end for end and it is rotated in the opposite direction, the two records thus produced in the magnetometer (of the type illustrated in my said application) should be absolutely symmetrical with respect to a central axis and of smooth sinusoidal form. Absence of symmetry or smoothness may indicate an unbalanced condition of the magnetic system, location of the core support to one side of the vertical axis of the suspended system, or the presence of foreign magnetic materials carried by the moving parts of the core mounting. An examination of the type of record which is produced will generally readily lead to a recognition of the causes of any maladjustment of the apparatus. The various types of abnormal records which may be produced need not be considered here, since their interpretation will be obvious to any one skilled in the use of such an instrument.

Additionally, the dummy core will give a good indication of the sensitivity of the apparatus, particularly if the apparatus has been previously calibrated in the fashion hereafter described. The amplitude of the swings of the record should be of some normal amount unless there is some change in the sensitivity of the magnetic system. Such changes may be due, for example, to a reduction of the pole strength of the suspended magnets, or the formation of magnetic poles due to various causes on the surrounding housing.

Figure 2:
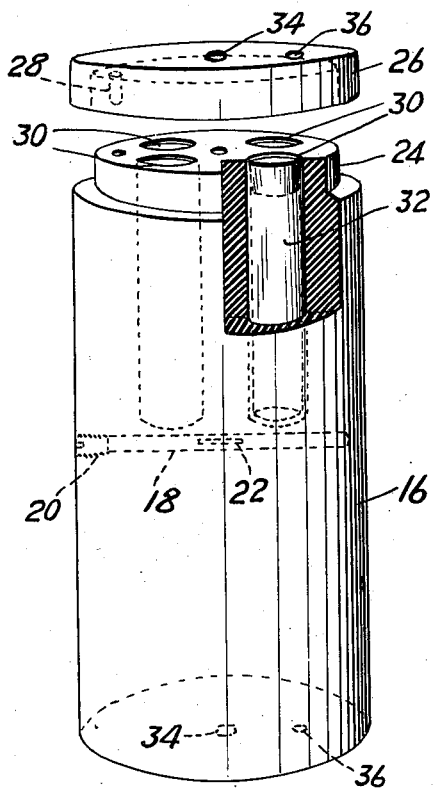
Figure 2 is a perspective view, partly in section, showing a more elaborate form of dummy core used for giving somewhat more extensive information than that illustrated in Figure 1.

While the core of Figure 1 is adapted for the routine testing of the magnetometer, a dummy core is desirable for still other purposes, and for such other purposes preferably takes the more elaborate form, illustrated in Figure 2. The purpose of this second form of core may be understood when it is considered that a natural core taken from the earth may give records in forward and reverse runs having very peculiar appearances and on first study having relatively little relationship to each other. In my said application, I have illustrated a moderately complicated type of record which may be rather readily analyzed in a graphical fashion in such manner as to segregate the results due to magnetic polarization and the results due to anisotropic susceptibility. In actual cases, however, more complicated records may occasionally result, and while analysis may lead to general conclusions, some detailed characteristics of the records may be difficult to analyze. Such analysis may be considerably facilitated by running in the apparatus a core of the type illustrated in Figure 2, in which differences in magnetic properties may be readily artificially introduced so as to try to duplicate with the dummy core the results secured from a natural one. If adjustments of the dummy core can be made to produce the same results as a natural core, then it is possible to determine the conditions existing in the natural core.

The core illustrated in Figure 2 comprises a body 16 of Bakelite or similar homogenous non-magnetic material bored transversely to receive a removable rod 18 of Bakelite or similar material in which is embodied a magnetic needle 22, the rod being securable in definite position within the body of the core by threads 20. The removability of the rod is desirable since the magnetic needle which it contains may then be magnetized or demagnetized at will to secure any desired pole strength, or alternatively, a number of such rods may be provided having different known pole strengths, so that any one of them may be located in the core as desired.

At one end the core is provided with a turned down portion 24 adapted to receive a cap 26 which, in conjunction with the body 16, forms a cylinder of definite dimensions. The cap closes the ends of a series of bores 30 designed to receive tubes 32 containing liquids of varying susceptibilities. For example, suitable liquids for this purpose are solutions of iron salts, such as ferric chlorides. Such solutions may be made up to known concentrations and, therefore, of known susceptibility, and inasmuch as they are liquid, they cannot have any polarity. Thus zones of definite susceptibility with assurance of no polarity may be provided in the core unsymmetrically located with respect to its axis. While the holes 30 for the tubes are provided in only one end of the core, it may be noted that this will generally suffice, since the assymmetry so produced is the equivalent of that which might be produced by a more elaborate arrangement of the tubes. The core is provided with center holes 34 and driving pin holes 36, as in the case of the core of Figure 1.

Figure 5:
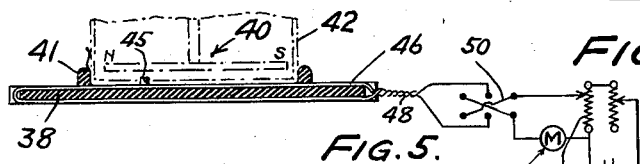
Figure 5 is a transverse section of the coil structure of Figure 4, illustrating diagrammatically the energizing circuit therefor.
Figure 4:
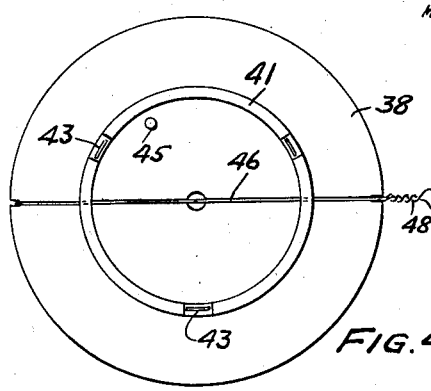
Figure 4 is a plan view of a coil structure adapted for the absolute calibration of the magnetometer.

In Figures 4 and 5, there is illustrated a calibrating device comprising a disc 38 which may be of non-magnetic metal or other material having no anisotropic susceptibility. The disc is provided with a raised centering ring 41 arranged to surround the magnetometer housing as indicated in Figure 5. Springs 43 are provided to hold the disc on the housing, while a dowel pin 45 on the disc is arranged to enter a hole in the housing to insure that the disc may be located in only one position.

In slots in the disc there is arranged a single loop 46 of conductor wire constituting a coil adapted to produce a magnetic field. The leads from this loop, indicated at 48, are twisted so as not to contribute to the formation of the field and are connected through a reversing switch 50, a milliammeter and a potentiometer arrangement 54 to an energizing battery 56.

The coil arrangement just described provides for the absolute calibration of the instrument when it is located in its proper definite position with respect to the suspended magnetic system. It bears a definite geometrical relation to the system and the field produced by any current therein indicated by the milliammeter may, therefore, be calculated. By varying the currents and observing the deflections of the magnetic system, the sensitivity of the magnetometer can thus be arrived at by a process of mathematical calculations.

In the practice of the calibrating method forming the subject-matter of this invention, the magnetometer is first calibrated in absolute fashion by the use of the coil arrangement just described. Thereafter the dummy core of Figure 1 may be located in proper position relative to the suspended system and the deflections produced during its rotation noted. By a further calculation, therefore, the strength of the field produced by the dummy core may be obtained. Instead, therefore, of going through the elaborate process of calibration by means of varying the currents through a coil, the dummy core may be located and run in the apparatus from time to time to indicate whether the apparatus has the proper sensitivity and is in proper adjustment. A further advantage of the use of the dummy core is that the core driving devices are brought into operation in the same fashion as when the magnetic properties of a rock core are being determined. Thus any contamination of the moving parts by magnetic materials or any irregularities in operation will become evident. The core of Figure 2 may, of course, be used in the same fashion as the core of Figure 1 if the tubes providing susceptible material are absent. However, the primary purpose of the dummy core of Figure 2 is to duplicate results secured from rock cores in an attempt to more readily determine the characteristics of the rock cores. The magnetic needles in either of the dummy cores may, of course, be polarized or depolarized in conventional fashion, depolarization being accomplished by exposure to a gradually decreasing alternating field.

What I claim and desire to protect by Letters Patent is:

1. The method of testing a magnetometer having a suspended magnetic system adjacent which a rock core is adapted to be rotated comprising locating in definite position relative to said system a coil, passing through said coil a measured current to produce thereby a determinate field affecting said suspended system, determining the effect on the system of such field, and then rotating adjacent said system, in the position to be occupied by a rock core, a dummy core of fixed magnetic characteristics to thereby ascertain the normal results on the magnetic system to be expected by such manipulation of said dummy core.

2. A dummy core for use in testing a magnetometer having a suspended magnetic system adjacent which a rock core is adapted to be rotated comprising a magnetic body and a cylindrical carrier therefor arranged to be rotated in the location of rotation of a rock core, said magnetic body having its magnetic axis transverse to the axis of said cylinder.

3. A dummy core for use in testing a magnetometer having a suspended magnetic system adjacent which a rock core is adapted to be rotated comprising a magnetic body, a carrier therefor arranged to be rotated in the location of rotation of a rock core, and means for providing predetermined conditions of anisotropic susceptibility of the carrier.

4. A dummy core for use in testing a magnetometer having a suspended magnetic system adjacent which a rock core is adapted to be rotated comprisng a magnetic body, a carrier therefor arranged to be rotated in the location of rotation of a rock core, and means for providing predetermined conditions of anisotropic susceptibility of the carrier, the last named means comprising at least one receptacle for a solution of relatively highly susceptible material.

JOHN M. PEARSON.